US011298802B2

(12) United States Patent
Sun et al.

(10) Patent No.: US 11,298,802 B2
(45) Date of Patent: Apr. 12, 2022

(54) FIXTURE OF A REPAIRING CALIPER

(71) Applicant: CITIC Dicastal Co., Ltd., Qinhuangdao (CN)

(72) Inventors: Aijun Sun, Qinhuangdao (CN); Ning Ma, Qinhuangdao (CN); Liqun Zheng, Qinhuangdao (CN)

(73) Assignee: CITIC Dicastal Co., Ltd., Qinhuangdao (CN)

( * ) Notice: Subject to any disclaimer, the term of this patent is extended or adjusted under 35 U.S.C. 154(b) by 224 days.

(21) Appl. No.: 16/817,558

(22) Filed: Mar. 12, 2020

(65) Prior Publication Data

US 2020/0290176 A1 Sep. 17, 2020

(30) Foreign Application Priority Data

Mar. 15, 2019 (CN) .......................... 201910197955.3

(51) Int. Cl.
*B25B 11/00* (2006.01)
*B24B 41/00* (2006.01)
*B24B 41/02* (2006.01)
*G01B 3/24* (2006.01)

(52) U.S. Cl.
CPC ............ *B25B 11/00* (2013.01); *B24B 41/005* (2013.01); *B24B 41/02* (2013.01); *G01B 3/24* (2013.01)

(58) Field of Classification Search
CPC ....... B25B 11/00; B24B 41/005; B24B 41/02; G01B 3/24; G01B 3/20; B23Q 1/01–017; B23Q 1/0054; B23Q 1/25; B23Q 1/56–628; F16D 65/0037; F16D 65/0043

USPC ............................................ 269/56, 55, 291
See application file for complete search history.

(56) References Cited

FOREIGN PATENT DOCUMENTS

| CN | 2048956 U | * | 12/1989 |
| CN | 203887661 U | * | 10/2014 |
| CN | 203993405 U | * | 12/2014 |
| CN | 106239353 A | * | 12/2016 |
| CN | 110450017 A | * | 11/2019 |

OTHER PUBLICATIONS

English Translation of CN-2048956 (Year: 1989).*
English Translation of CN-203993405 (Year: 2014).*
English Translation of CN-203887661 (Year: 2014).*
English Translation of CN-110450017 (Year: 2019).*
English Translation of CN-106239353 (Year: 2016).*

* cited by examiner

*Primary Examiner* — Monica S Carter
*Assistant Examiner* — Leanna R Lincoln
(74) *Attorney, Agent, or Firm* — IPro, PLLC

(57) ABSTRACT

The invention discloses a caliper repairing clamp, which relates to the technical field of calipers and comprises a machine body, wherein a polishing disc is arranged inside the machine body, a protective cover is arranged on the outer surface of the polishing disc, a moving table is arranged below the machine body, a polishing table is arranged above the moving table, a fixed table is fixedly connected to the upper surface of the polishing table, a first bearing is fixedly embedded inside the machine body, a rotating handle is arranged below the moving table, and a first threaded rod is fixedly connected to the upper surface of the rotating handle.

6 Claims, 4 Drawing Sheets

FIXTURE OF A REPAIRING CALIPER

TECHNICAL FIELD

The invention relates to the technical field of calipers, in particular to a fixture for repairing a caliper.

BACKGROUND

The caliper is a measuring tool for measuring length, inner diameter, outer diameter and depth, has the functions of measurement and inspection, is a measuring tool for measurement and inspection, is one of the main categories of the length measuring tool, and is one of the most main varieties of the length measuring tool.

Caliper rule's a great variety, the deformation can appear after the long-time use in the slide caliper rule, at this moment need restore slide caliper rule with the equipment of restoring the slide caliper rule, but the equipment of present restoration slide caliper rule is at the inconvenient fixed slide caliper rule of the in-process of restoring the slide caliper rule, and work efficiency is lower, provides an anchor clamps of restoring the slide caliper rule for this reason, improves the practicality and the work efficiency of restoring slide caliper rule equipment.

SUMMARY

The invention aims to provide a fixture of a repairing caliper which has the advantage of convenience in fixing a caliper and solves the problem that a caliper is inconvenient to fix by a repairing device.

In order to solve the technical problems, the invention provides the following technical scheme: a grinding stone is arranged in the machine body, the outer surface of the grinding stone is provided with a protection cover, a movable table is arranged below the machine body, a grinding table is arranged above the movable table, and the upper surface of the grinding table is fixedly connected with a fixing table, the interior of the machine body is fixedly inlaid with a first bearing, a rotating handle is arranged below the movable table, the upper surface of the rotating handle is fixedly connected with a first thread rod, the interior of the movable table is fixedly connected with a first thread ring, the top end of the first thread rod penetrates an inner ring of the first thread ring and extends to the upper side of the movable table, and the inner ring of the first thread ring is threadedly connected to the outer surface of the first thread rod, the top end of the first thread rod is fixedly connected to an inner ring of the first bearing, the bottom surface of the machine body is fixedly connected with two symmetrical polished rods, the interior of the movable table is fixedly connected with two symmetrical slip rings, the upper surface of the movable table is provided with a first chute, the bottom surface of the grinding table is fixedly connected with a first sliding block adapted to the first chute, and the first sliding block is slidably connected to the interior of the first chute.

The middle part at the bottom surface of the fixing table is provided with a through hole, the upper surface of the through hole is fixedly inlaid with a second bearing, a rotating round bar is arranged above the fixing table, the bottom surface of the rotating round bar is fixedly connected with a second thread rod, the bottom end of the second thread rod penetrates the fixing table and fixedly connected to an inner ring of the second bearing, the outer surface of the second thread rod is threadedly connected with a second thread ring, the left and right side surfaces of the second thread ring are both fixedly connected with fixing rods, the bottom surfaces of the fixing rods are fixedly connected with supporting rods, the bottom end of each of the supporting rods is fixedly hinged with a pulley through a pin shaft, the upper surface of the grinding table is provided with two symmetrical second chutes, the interior of the fixing table is provided with two symmetrical movable blocks, the side surfaces of the two movable blocks departing away from each other are in contact with the outer surfaces of two pulleys respectively, the side surfaces of the two movable blocks approaching to each other are fixedly connected with cross rods, the ends of the two cross rods approaching to each other both penetrate the fixing table and extend to the interior of the through hole, and the end of each of the cross rods departing away from the movable block is fixedly connected with a fixing fixture.

Furthermore, the bottom end of each of the polished rods penetrates the inner ring of the slip ring and extends to the lower side of the movable table, the inner rings of the slip rings are slidably connected to the outer surfaces of the polished rods, and the bottom and top ends of each of the polished rods are both fixedly connected with stop blocks.

By adopting the technical scheme, the convenience of the movable table in the process of utilizing the first spiral ring to move back and forth is improved under the action of the polished rod, and the phenomenon of difficulty in moving caused by the fact that the movable table slides out of the polished rod is prevented under the action of the limiting block.

Furthermore, the right side surface of the movable table is fixedly connected with a fixing plate, a rotating disc is arranged above the fixing plate, the right side surface of the rotating disc is fixedly connected with a handle, and a connecting rod is arranged above the rotating disc.

Through adopting above-mentioned technical scheme, remove the rolling disc through the handle, utilize the effect of connecting rod, make slide caliper rule remove when removing more convenience about the restoration in-process.

Furthermore, the interior of the fixing table is fixedly connected with two symmetrical sliding bars, the outer surface of each of the sliding bars is slidably connected with a sliding sleeve, and the side surfaces of the two sliding sleeves approaching to each other are respectively fixedly connected to the ends of the two fixing rods departing away from each other.

By adopting the technical scheme, the sliding sleeve slowly slides on the sliding rod, so that the second spiral ring is more stable when the fixing rod is driven to move up and down, and the movable block is more stable when being pushed to move.

Furthermore, the bottom surface of each of the movable blocks is fixedly connected with a second sliding block adapted to the second chute, and the second sliding block is slidably connected to the interior of the second chute.

Through adopting above-mentioned technical scheme, through the second slider in the inside slip of second spout, improved the movable block more stable when promoting the mounting fixture removal.

Furthermore, that the outer surface of each of the cross rods is sleeved with a spring, the ends of the two springs departing away from each other are respectively fixedly connected with the side surfaces of the two movable blocks approaching to each other, and the ends of the two springs approaching to each other are respectively fixedly connected with the left and right side surfaces of the through hole.

By adopting the technical scheme, the movable block is enabled to be reset more quickly by utilizing the performance of the spring under the condition of no stress under the action of the spring.

Compared with the prior art, this restoration slide caliper's anchor clamps can make the bracing piece more stable when utilizing the pulley to promote the movable block to remove through setting up the second spiral ring under the effect of dead lever, sliding sleeve and slide bar, has possessed and promoted the movable block and removed convenient advantage under the effect of pulley, through setting up the movable block, under the effect of second spout and second slider, has reached the convenient effect of movable block slip, solves the inconvenient fixed slide caliper's of prosthetic devices problem.

According to the invention, the rotating round rod is arranged, so that the second spiral ring can move up and down more conveniently under the action of the second threaded rod, the second bearing and the second spiral ring, the purpose of better repairing effect of the fixed caliper is achieved under the action of the cross rod and the fixed clamp by arranging the movable block, the convenience of the fixed clamp is improved under the action of the spring by arranging the cross rod, and the problem that the fixed caliper is inconvenient to repair equipment is solved.

In the figures: 1—machine body, 2—protection cover, 3—grinding stone, 4—movable table, 5—grinding table, 6—fixed table, 7—first bearing, 8—first threaded rod, 9—rotating handle, 10—first spiral ring, 11—polished rod, 12—limited block, 13—first slide block, 14—first sliding groove, 15—fixed plate, 16—handle, 17—rotating disk, 18—connecting rod, 19—through hole, 20—second bearing, 21—rotating round rod, 22—second threaded rod, 23—second spiral ring, 24—fixed rod, 25—supporting rod, 26—pulley, 27—sliding rod, 28—sliding sleeve, 29—second sliding groove, 30—movable block, 31—second slide block, 32—cross rod, 33—spring, 34—stationary clamp, 35—slip ring.

DETAILED DESCRIPTION

The technical solutions in the embodiments of the present invention will be clearly and completely described below with reference to the drawings in the embodiments of the present invention, and it is obvious that the described embodiments are only a part of the embodiments of the present invention, and not all of the embodiments. All other embodiments, which can be obtained by a person skilled in the art without making any creative effort based on the embodiments in the present invention, belong to the protection scope of the present invention.

Figure 1:
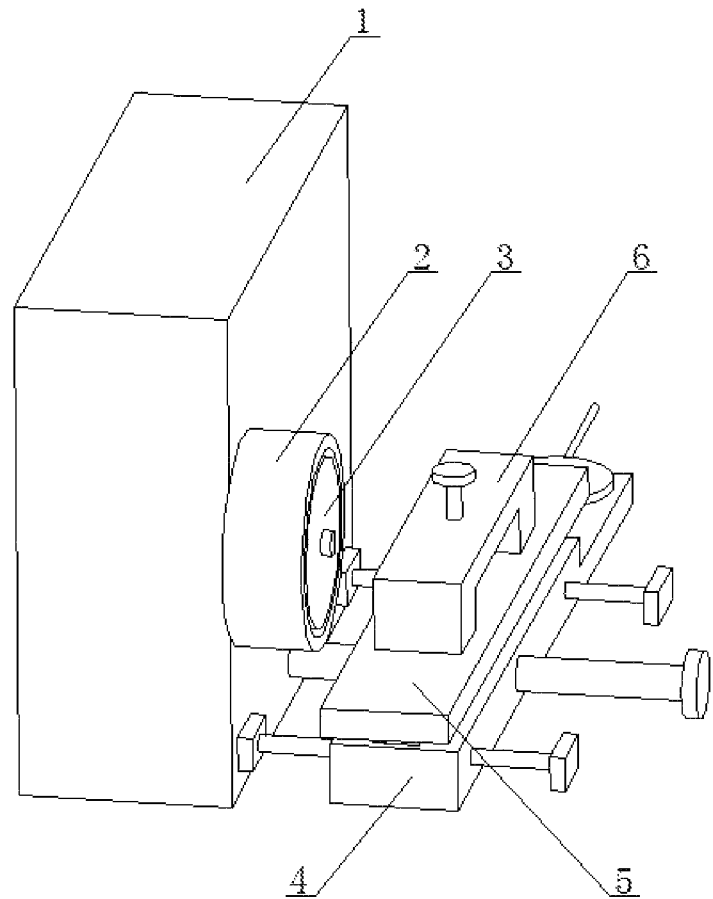
FIG. 1 is a perspective view of the body of the present invention.
Figure 2:
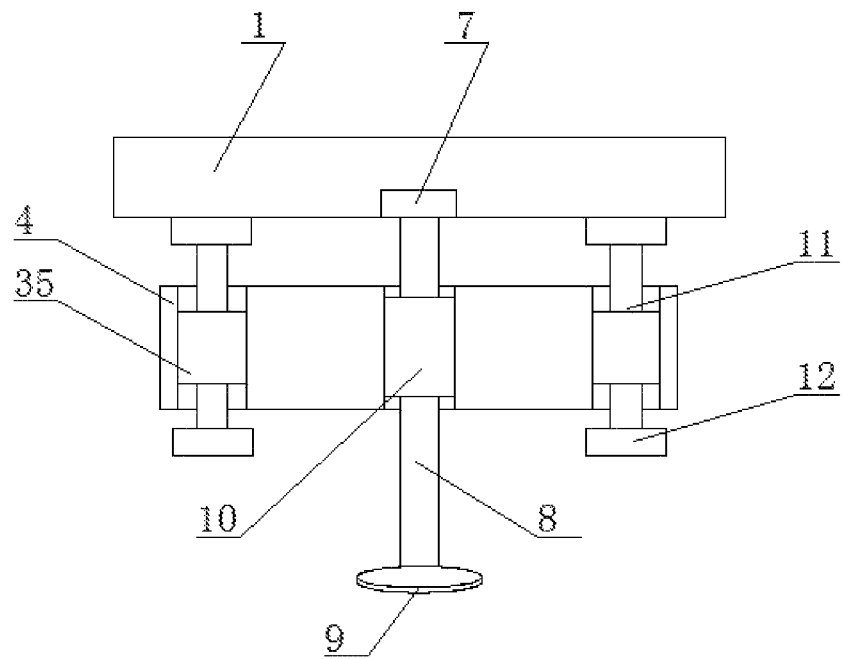
FIG. 2 is a cross-sectional view of a top view of the movable table of the present invention.
Figure 3:
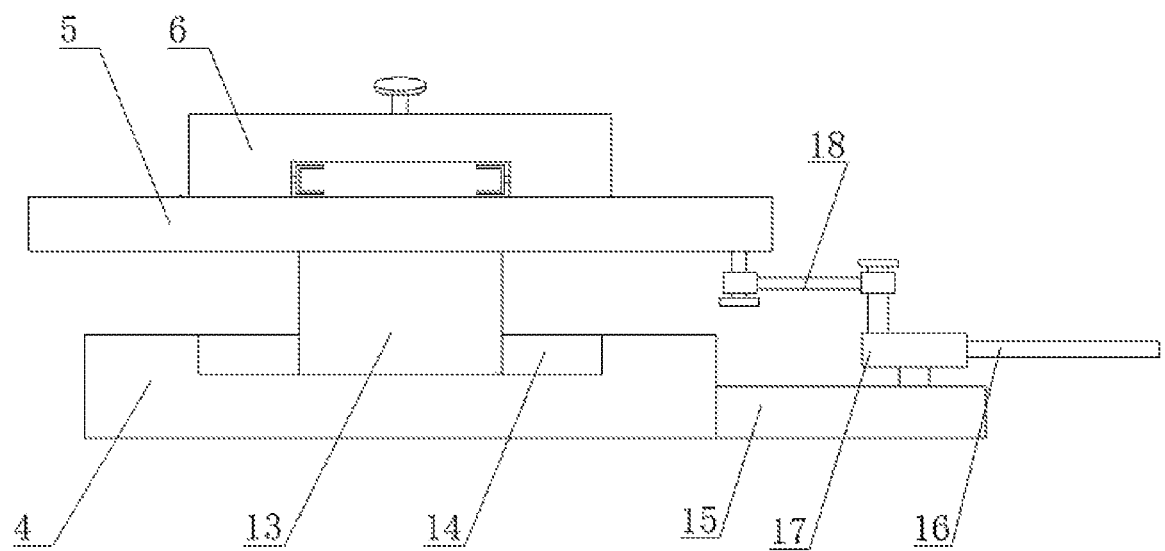
FIG. 3 is a cross-sectional view of a front view of the movable table of the present invention.
Figure 4:
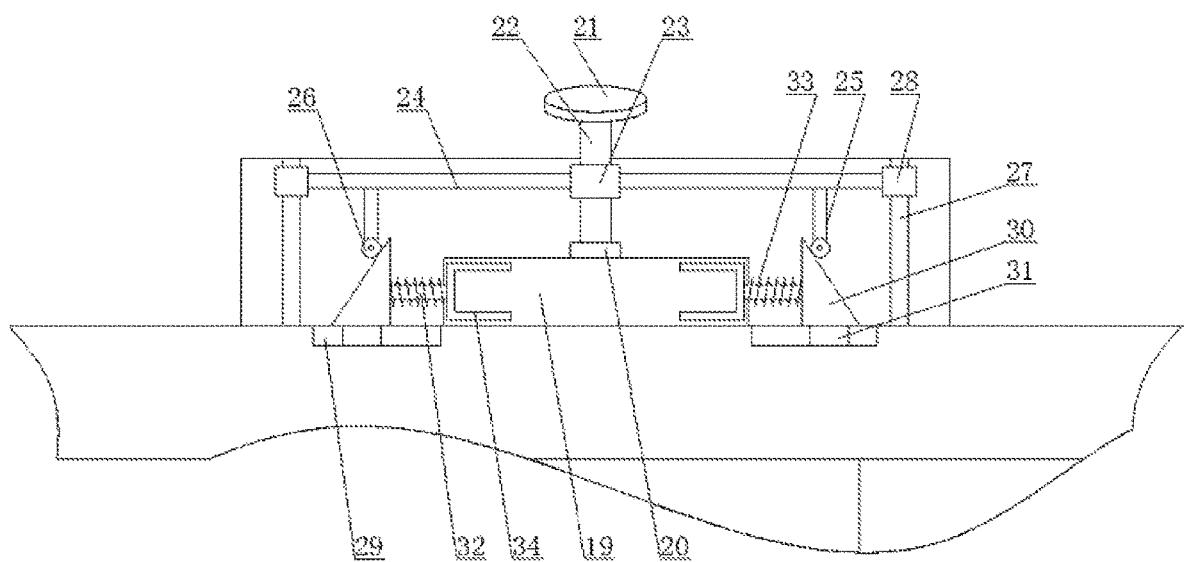
FIG. 4 is a cross-sectional view of a front view of the fixed table of the present invention.

Referring to FIGS. 1-4, the present invention provides a technical solution: a caliper repairing clamp comprises a machine body 1, a grinding stone 3 is arranged inside the machine body 1, a protection cover 2 is arranged on the outer surface of the grinding stone 3, a movable table 4 is arranged below the machine body 1, a grinding table 5 is arranged above the movable table 4, a fixed table 6 is fixedly connected to the upper surface of the grinding table 5, a first bearing 7 is fixedly embedded inside the machine body 1, a rotating handle 9 is arranged below the movable table 4, a first threaded rod 8 is fixedly connected to the upper surface of the rotating handle 9, a first spiral ring 10 is fixedly connected inside the movable table 4, the top end of the first threaded rod 8 penetrates through the inner ring of the first spiral ring 10 and extends to the upper side of the movable table 4, the inner ring of the first spiral ring 10 is in threaded connection with the outer surface of the first threaded rod 8, the top end of the first threaded rod 8 is fixedly connected with the inner ring of the first bearing 7, two symmetrical polished rods 11 are fixedly connected to the bottom surface of the machine body 1, two symmetrical slip rings 35 are fixedly connected to the inside of the movable table 4, the bottom end of each polished rod 11 penetrates through the inner ring of the slip ring 35 and extends to the lower side of the movable table 4, the inner ring of the slip ring 35 is connected with the outer surface of the polished rod 11 in a sliding manner, the bottom end and the top end of each polished rod 11 are fixedly connected with a limiting block 12, the convenience of the movable table 4 in moving back and forth by using the first spiral ring 10 is improved by using the action of the polished rod 11, the phenomenon that the movable table 4 slides out of the polished rod 11 and is difficult to move is prevented by using the action of the limiting blocks 12, a first sliding groove 14 is formed in the upper surface of the movable table 4, a first sliding block 13 matched with the first sliding groove 14 is fixedly connected to the bottom surface of the grinding table 5, a fixed plate 15 is fixedly connected to the right side surface of the movable table 4, a rotating disk 17 is arranged above the fixed plate 15, and a handle 16 is fixedly connected to the right side surface of the rotating disk 17, a connecting rod 18 is arranged above the rotating disk 17, the rotating disk 17 is moved through the handle 16, the caliper is more convenient to move left and right in the repairing process under the action of the connecting rod 18, and the first sliding block 13 is connected inside the first sliding groove 14 in a sliding mode.

A through hole 19 is formed in the middle of the bottom surface of the fixed table 6, a second bearing 20 is fixedly embedded in the upper surface of the through hole 19, a rotating round rod 21 is arranged above the fixed table 6, a second threaded rod 22 is fixedly connected to the bottom surface of the rotating round rod 21, the bottom end of the second threaded rod 22 penetrates through the fixed table 6 and is fixedly connected with the inner ring of the second bearing 20, a second spiral ring 23 is in threaded connection with the outer surface of the second threaded rod 22, fixing rods 24 are fixedly connected to the left side surface and the right side surface of the second spiral ring 23, supporting rods 25 are fixedly connected to the bottom surface of the fixing rods 24, a pulley 26 is fixedly hinged to the bottom end of each supporting rod 25 through a pin shaft, two symmetrical second sliding grooves 29 are formed in the upper surface of the grinding table 5, two symmetrical movable blocks 30 are arranged inside the fixed table 6, one side surface, two symmetrical slide robs 27 are fixedly connected to the inside of the fixed table 6, the outer surface of each slide rob 27 is slidably connected with a sliding sleeve 28, one side surface of each sliding sleeve 28, which is close to each other, is fixedly connected with one end of each fixed rod 24, which is far away from each other, respectively, the sliding sleeves 28 slide slowly on the slide rob 27, so that the second spiral ring 23 is more stable when the fixed rods 24 are driven to move up and down, and the movable blocks 30 are more stable when being pushed to move, a cross rod 32 is fixedly connected to one side surface of each movable block 30, which is close to each other, one end of each cross rod 32, which is close to each other, penetrates through the fixed table 6 and extends to the inside of the through hole 19, one end of each cross rod 32, which is far away from each movable block 30, is fixedly connected with a stationary clamp 34, a second slide block 31, which, through second slide block 31 in the inside slip of second sliding groove 29, the removal of movable block 30 when promoting stationary clamp 34 removal is more stable, every cross rod 32 surface all overlaps and is equipped with spring 33, the one end that two springs 33 kept away from each other respectively with the side fixed connection that two movable blocks 30 are close to each other, the one end that two springs 33 are close to each other respectively with the left and right sides face fixed connection of through hole 19, through the effect of spring 33, make movable block 30 utilize spring 33's performance under the circumstances of not being forced, it is more swift to make movable block 30 reset.

When the caliper is used, the caliper penetrates through the through hole 19, the hand rotates the rotating round rod 21 to drive the second threaded rod 22 and the inner ring of the second bearing 20 to rotate, the second spiral ring 23 slides on the second threaded rod 22, the fixed rod 24 is driven to move when the second spiral ring 23 moves up and down, the fixed rod 24 utilizes the sliding sleeve 28 fixedly connected to enable the sliding sleeve 28 to slide on the sliding rod 27 to increase stability, when the fixed rod 24 moves downwards, the supporting rod 25 is pushed to move downwards, the supporting rod 25 utilizes the pulley 26 to slide downwards, the movable block 30 utilizes the second slide block 31 to slowly slide in the second sliding groove 29, when the movable block 30 moves, the spring 33 is in a stressed state, the caliper is fixed by the stationary clamp 34, and therefore the convenience for fixing the caliper is achieved, and the working efficiency is improved.

Although embodiments of the present invention have been shown and described, it will be appreciated by those skilled in the art that various changes, modifications, substitutions and alterations can be made in these embodiments without departing from the principles and spirit of the invention, the scope of which is defined in the appended claims and their equivalents.

What is claimed is:

1. A fixture of a repairing caliper, comprising a machine body (1), wherein a grinding stone (3) is arranged in the machine body (1), the outer surface of the grinding stone (3) is provided with a protection cover (2), a movable table (4) is arranged below the machine body (1), a grinding table (5) is arranged above the movable table (4), and the upper surface of the grinding table (5) is fixedly connected with a fixing table (6), characterized in that the interior of the machine body (1) is fixedly inlaid with a first bearing (7), a rotating handle (9) is arranged below the movable table (4), the upper surface of the rotating handle (9) is fixedly connected with a first thread rod (8), the interior of the movable table (4) is fixedly connected with a first thread ring (10), the top end of the first thread rod (8) penetrates an inner ring of the first thread ring (10) and extends to the upper side of the movable table (4), and the inner ring of the first thread ring (10) is threadedly connected to the outer surface of the first thread rod (8), the top end of the first thread rod (8) is fixedly connected to an inner ring of the first bearing (7), the bottom surface of the machine body (1) is fixedly connected with two symmetrical polished rods (11), the interior of the movable table (4) is fixedly connected with two symmetrical slip rings (35), the upper surface of the movable table (4) is provided with a first chute (14), the bottom surface of the grinding table (5) is fixedly connected with a first sliding block (13) adapted to the first chute (14), and the first sliding block (13) is slidably connected to the interior of the first chute (14); and the middle part at the bottom surface of the fixing table (6) is provided with a through hole (19), the upper surface of the through hole (19) is fixedly inlaid with a second bearing (20), a rotating round bar (21) is arranged above the fixing table (6), the bottom surface of the rotating round bar (21) is fixedly connected with a second thread rod (22), the bottom end of the second thread rod (22) penetrates the fixing table (6) and fixedly connected to an inner ring of the second bearing (20), the outer surface of the second thread rod (22) is threadedly connected with a second thread ring (23), the left and right side surfaces of the second thread ring (23) are both fixedly connected with fixing rods (24), the bottom surfaces of the fixing rods (24) are fixedly connected with supporting rods (25), the bottom end of each of the supporting rods (25) is fixedly hinged with a pulley (26) through a pin shaft, the upper surface of the grinding table (5) is provided with two symmetrical second sliding groove (29), the interior of the fixing table (6) is provided with two symmetrical movable blocks (30), the side surfaces of the two movable blocks (30) departing away from each other are in contact with the outer surfaces of two pulleys (26) respectively, the side surfaces of the two movable blocks (30) approaching to each other are fixedly connected with cross rods (32), the ends of the two cross rods (32) approaching to each other both penetrate the fixing table (6) and extend to the interior of the through hole (19), and the end of each of the cross rods (32) departing away from the movable block (30) is fixedly connected with a stationary clamp (34).

2. The fixture of a repairing caliper according to claim 1, characterized in that the bottom end of each of the polished rods (11) penetrates the inner ring of the slip ring (35) and extends to the lower side of the movable table (4), the inner rings of the slip rings (35) are slidably connected to the outer surfaces of the polished rods (11), and the bottom and top ends of each of the polished rods (11) are both fixedly connected with stop blocks (12).

3. The fixture of a repairing caliper according to claim 1, characterized in that the right side surface of the movable table (4) is fixedly connected with a fixing plate (15), a rotating disc (17) is arranged above the fixing plate (15), the right side surface of the rotating disc (17) is fixedly connected with a handle (16), and a connecting rod (18) is arranged above the rotating disc (17).

4. The fixture of a repairing caliper according to claim 1, characterized in that the interior of the fixing table (6) is fixedly connected with two symmetrical sliding bars (27), the outer surface of each of the sliding bars (27) is slidably connected with a sliding sleeve (28), and the side surfaces of the two sliding sleeves (28) approaching to each other are respectively fixedly connected to the ends of the two fixing rods (24) departing away from each other.

5. The fixture of a repairing caliper according to claim 1, characterized in that the bottom surface of each of the movable blocks (30) is fixedly connected with a second sliding block (31) adapted to the second chute (29), and the second sliding block (31) is slidably connected to the interior of the second chute (29).

6. The fixture of a repairing caliper according to claim 1, characterized in that the outer surface of each of the cross rods (32) is sleeved with a spring (33), the ends of the two springs (33) departing away from each other are respectively fixedly connected with the side surfaces of the two movable blocks (30) approaching to each other, and the ends of the two springs (33) approaching to each other are respectively fixedly connected with the left and right side surfaces of the through hole (19).

* * * * *